US012581185B2

(12) United States Patent
Wasu et al.

(10) Patent No.: US 12,581,185 B2
(45) Date of Patent: Mar. 17, 2026

(54) METHOD FOR CAMERA ALIGNMENT MITIGATIONS FOR SYSTEMS WITH MULTIPLE CAMERAS

(71) Applicant: Apple Inc., Cupertino, CA (US)

(72) Inventors: Avijit S. Wasu, Santa Clara, CA (US); Anandhakumar Chinnaiyan, San Ramon, CA (US); Benjamin A. Darling, Cupertino, CA (US); Florian Ciurea, Campbell, CA (US); Tao Zhang, Campbell, CA (US); Zejing Wang, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 75 days.

(21) Appl. No.: 18/621,999

(22) Filed: Mar. 29, 2024

(65) Prior Publication Data

US 2025/0088731 A1     Mar. 13, 2025

Related U.S. Application Data

(60) Provisional application No. 63/581,829, filed on Sep. 11, 2023.

(51) Int. Cl.
| | |
|---|---|
| *H04N 23/63* | (2023.01) |
| *H04N 23/68* | (2023.01) |
| *H04N 23/69* | (2023.01) |
| *H04N 23/90* | (2023.01) |

(52) U.S. Cl.
CPC ........... *H04N 23/632* (2023.01); *H04N 23/69* (2023.01); *H04N 23/90* (2023.01); *H04N 23/683* (2023.01)

(58) Field of Classification Search
CPC ...... H04N 23/632; H04N 23/69; H04N 23/90; H04N 23/683
See application file for complete search history.

(56) References Cited

U.S. PATENT DOCUMENTS

| | | | | |
|---|---|---|---|---|
| 2022/0272268 A1* | 8/2022 | Cohen | | H04N 23/45 |
| 2022/0309709 A1* | 9/2022 | Stec | | H04N 23/675 |
| 2023/0059657 A1* | 2/2023 | Hu | | H04N 5/265 |

* cited by examiner

*Primary Examiner* — Gevell V Selby
(74) *Attorney, Agent, or Firm* — Blank Rome LLP

(57) ABSTRACT

Mitigations for camera alignment during image capture preview involve receiving a zoom level request for a multicamera system comprising a first camera having a first optical zoom metric and a second camera having a second optical zoom metric, and obtaining an image frame from the first camera. A target transformation is determined based on difference between the first optical zoom and a requested zoom level, the second camera's native optical zoom level, the relative orientation of the first and second cameras within the system framework and the relative intrinsics on the two cameras. The transformation is applied before, in conjunction with, or followed by a separate digital zoom transform to the image frame to obtain a transformed and digitally zoomed image frame transformation.

20 Claims, 6 Drawing Sheets

400

310

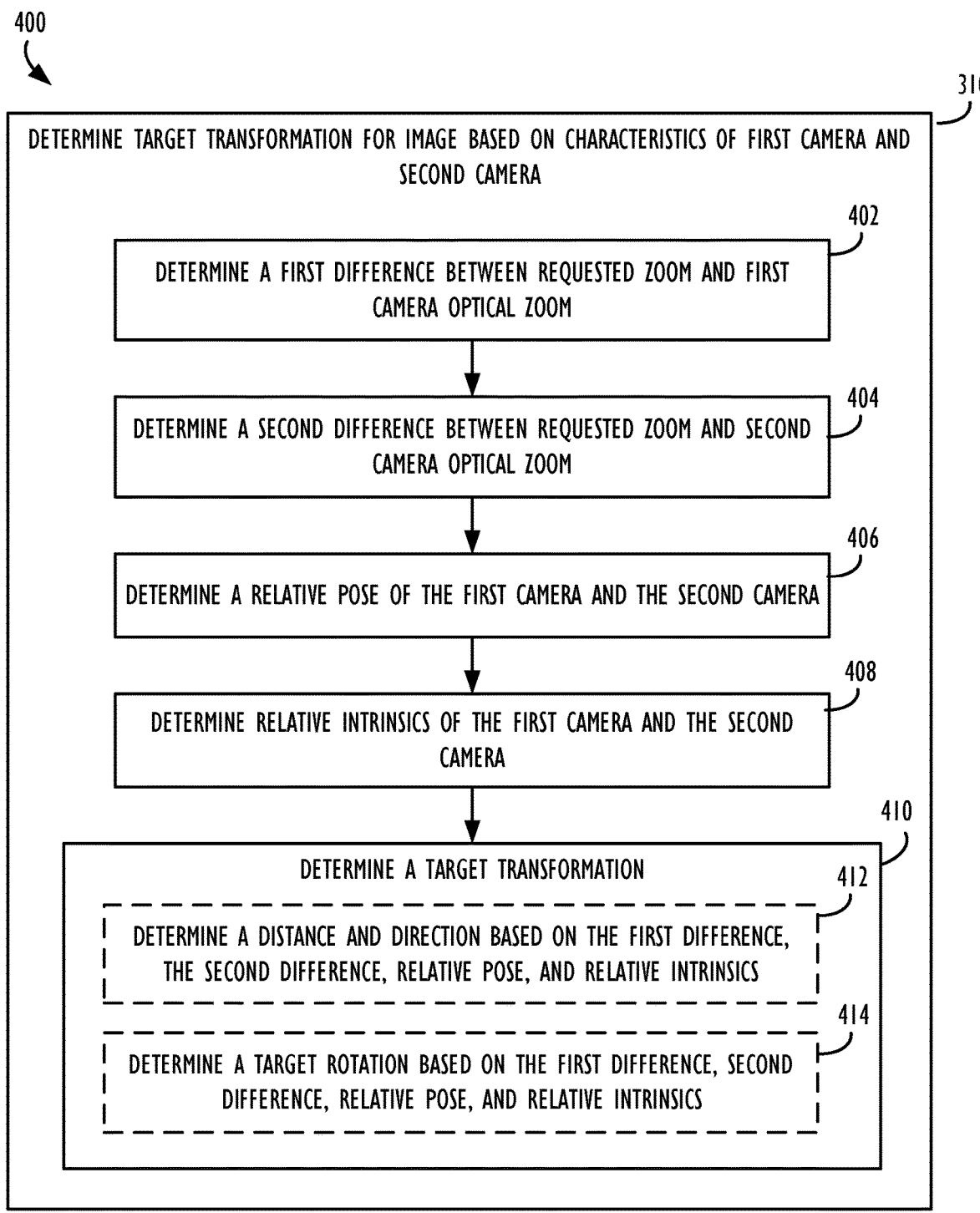

DETERMINE TARGET TRANSFORMATION FOR IMAGE BASED ON CHARACTERISTICS OF FIRST CAMERA AND SECOND CAMERA

402

DETERMINE A FIRST DIFFERENCE BETWEEN REQUESTED ZOOM AND FIRST CAMERA OPTICAL ZOOM

404

DETERMINE A SECOND DIFFERENCE BETWEEN REQUESTED ZOOM AND SECOND CAMERA OPTICAL ZOOM

406

DETERMINE A RELATIVE POSE OF THE FIRST CAMERA AND THE SECOND CAMERA

408

DETERMINE RELATIVE INTRINSICS OF THE FIRST CAMERA AND THE SECOND CAMERA

410

DETERMINE A TARGET TRANSFORMATION

412

DETERMINE A DISTANCE AND DIRECTION BASED ON THE FIRST DIFFERENCE, THE SECOND DIFFERENCE, RELATIVE POSE, AND RELATIVE INTRINSICS

414

DETERMINE A TARGET ROTATION BASED ON THE FIRST DIFFERENCE, SECOND DIFFERENCE, RELATIVE POSE, AND RELATIVE INTRINSICS

*FIG. 4*

METHOD FOR CAMERA ALIGNMENT MITIGATIONS FOR SYSTEMS WITH MULTIPLE CAMERAS

TECHNICAL FIELD

This disclosure relates generally to the field of digital image processing. More particularly, but not by way of limitation, it relates to techniques for mitigating issues related to imperfect camera alignment, which is apparent during image capture preview and recording relating to applications such as camera transitions or other applications where two camera views are used simultaneously or in rapid succession.

BACKGROUND

Image zooming is a commonly used feature in modern electronic image capture devices, such as smartphones, tablets, and other devices with embedded digital cameras. Various types of user interface (UI) elements or controls may be provided to users to control a desired zoom level during video capture operations, e.g., buttons, sliders, dials, gestures, audio, and/or text commands, etc.

In order to produce "preview" videos (i.e., videos that are streamed from an image capture device to a display of an electronic device as the video images are being captured) and/or "recorded" videos (i.e., videos that may be processed and saved to non-volatile memory after the conclusion of the video image capture operations). As a user zooms to different zoomed states, the device may transition among different cameras. However, this transition causes a change in field of view of the image due to misaligned cameras, even when observing scenes at a very far distance from the cameras.

Thus, what is needed is an approach to leverage various technological improvements to the control of image capture device hardware—as well as to the software stack responsible for processing of images captured by such image capture devices—to provide a smoother preview presentation during image capture preview, thereby also improving the quality and smoothness of the recorded videos and providing for a better overall user experience.

SUMMARY

Electronic devices, methods, and program storage devices for mitigating camera alignment issues during image capture preview are disclosed herein. The techniques described herein to improve the camera preview transitions include receiving a zoom level request for a multicamera system comprising a first camera having a first optical zoom metric and a second camera having a second optical zoom metric and obtaining an image frame from the first camera. A target transformation is determined based on a first difference between the first optical zoom and a requested zoom level, a second difference between the second optical zoom and the requested zoom level, and a relative pose of the first camera and the second camera within the multicamera system. In some embodiments, the target transformation is further based on the relative intrinsics of the two cameras. The transformation is applied before, in conjunction with, or followed by a digital zoom to the image frame to obtain a transformed and digitally zoomed image frame. The digital zoom is based on the requested zoom metric to obtain a digitally zoomed image frame. In some embodiments, the transformed digitally zoomed frame is presented as a preview frame. In some embodiments, the first camera has a first field of view, and the second camera has a second field of view narrower than the first field of view.

According to some embodiments, the technique additionally includes receiving an additional zoom level request at an additional zoom level, and in response to the additional zoom level request matching the second optical zoom metric, switching from image capture using the first camera to the second camera.

According to some embodiments, the technique additionally includes adjusting video image stabilization parameters applied to the digitally zoomed image frame, in accordance with the target transformation, to generate a stabilized version of the digitally zoomed image frame. The stabilized version of the digitally zoomed image frame can then be included in a stabilized video clip produced by the multi-camera system.

As mentioned above, various electronic device embodiments are disclosed herein. Such electronic devices may include, for example: a display; one or more processors; a memory coupled to the one or more processors; and a plurality of image capture devices. According to one embodiment, instructions may be stored in the memory, the instructions, when executed, causing the one or more processors to perform the techniques described above and herein.

Various methods of performing camera alignment mitigations are also disclosed herein, in accordance with the various electronic device embodiments enumerated above. Non-transitory program storage devices are also disclosed herein. The non-transitory program storage devices may store instructions for causing one or more processors to perform operations in accordance with the various electronic device and method embodiments enumerated above.

BRIEF DESCRIPTION OF THE DRAWINGS

FIG. 4 shows, in flowchart form, a technique for determining a target transformation for a preview image, according to one or more embodiments.

DETAILED DESCRIPTION

Figure 1:
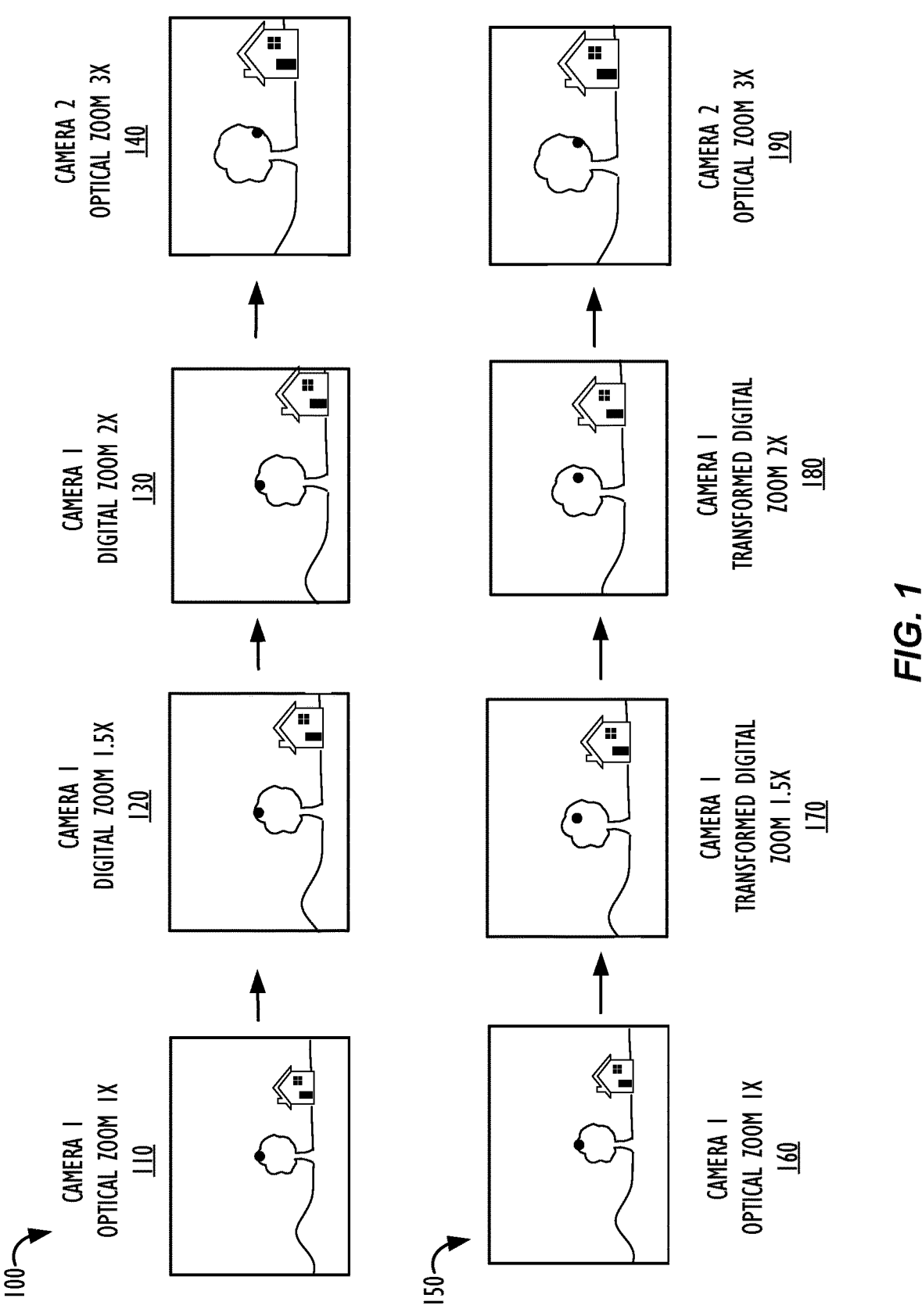
FIG. 1 illustrates an exemplary alignment mitigation framework, according to one or more embodiments.

Embodiments described herein are directed to a process for mitigating camera alignment issues in real-time; for example, during preview image capture. According to one or more embodiments, zoom level requests may be received dynamically during image capture preview; for example, by a user input component in a user interface during preview mode. As the user dynamically adjusts a requested zoom mode, the device may use images captured from one of the cameras, then digitally zoom the image to the requested zoom level. However, as the requested zoom level reaches a native zoom level of a different camera, the image capture will switch from the current camera to another camera. However, because the cameras are oriented differently from each other, the fields of view of the first and second camera may differ. As such, embodiments described herein provide a technique to adjust the field of view of an image captured by a first camera to approach the field of view of the camera with the next native zoom level such that when the device switches from one camera to another, the camera switch is less evident in the preview images.

The technique involves receiving a request for a particular zoom level during image capture preview using a multicamera system, which includes a first camera characterized by a first optical zoom metric and a second camera by a second optical zoom metric. Upon receiving the zoom request, an image frame is captured from the first camera. A target transformation is determined based a combination of one or more of: the difference between the first camera's optical zoom level and the requested zoom level, the second camera's native optical zoom level, the relative pose of the first and second cameras within the system framework, and the relative intrinsics on the two cameras. The transformation is applied before, together with, or followed by a digital zoom to the image frame to obtain a transformed and digitally zoomed image frame. The target transformation is then applied to the digitally zoomed image frame to produce a transformed and digitally zoomed image frame.

In the following description, for purposes of explanation, numerous specific details are set forth in order to provide a thorough understanding of the inventions disclosed herein. It will be apparent, however, to one skilled in the art that the inventions may be practiced without these specific details. In other instances, structure and devices are shown in block diagram form in order to avoid obscuring the inventions. References to numbers without subscripts or suffixes are understood to reference all instance of subscripts and suffixes corresponding to the referenced number. Moreover, the language used in this disclosure has been principally selected for readability and instructional purposes, and it may not have been selected to delineate or circumscribe the inventive subject matter, and, thus, resort to the claims may be necessary to determine such inventive subject matter. Reference in the specification to "one embodiment" or to "an embodiment" means that a particular feature, structure, or characteristic described in connection with the embodiments is included in at least one embodiment of one of the inventions, and multiple references to "one embodiment," or "an embodiment," should not be understood as necessarily all referring to the same embodiment.

Exemplary Camera Alignment Mitigation Operations

Turning now to FIG. 1, a first series of frames 100 is presented showing camera preview frames during image capture preview as a user zooms from 1× to 3× on a multi-camera image capture device. FIG. 1 also shows a second series of frames 150 showing camera preview frames during image capture preview as a user zooms from 1× to 3× on a multi camera image capture device, this time using camera alignment mitigations as described herein.

Figure 2A:
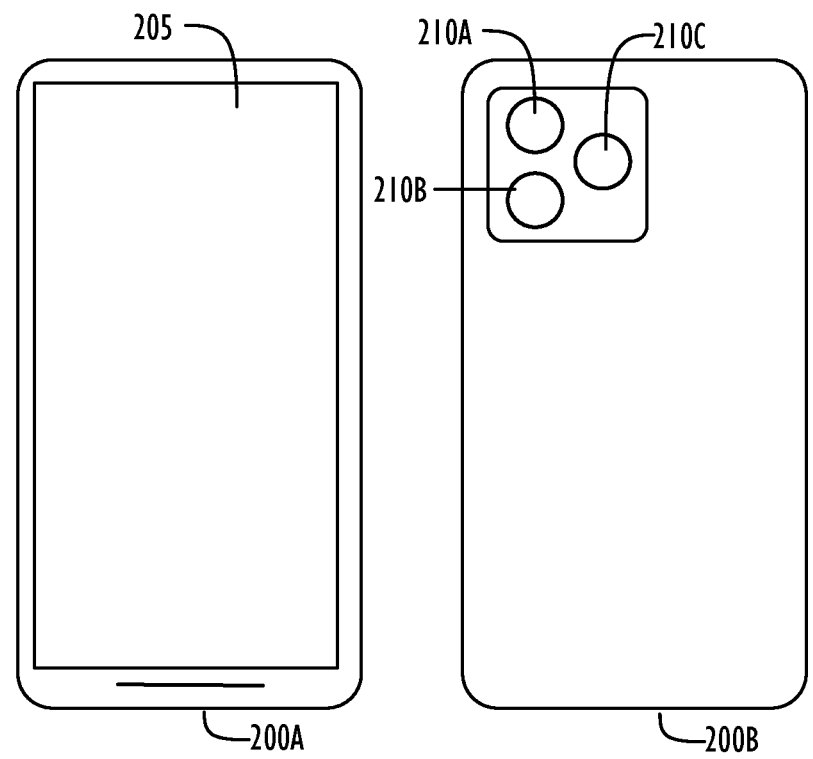
FIGS. 2A-2B illustrates example system setups for an electronic device having multiple image capture devices, in accordance with one or more embodiments.

For purposes of this example, these series of frames are captured by a first camera and a second camera of a multi-camera system. As an example, turning to FIG. 2A, an electronic device 200 can include a set of cameras from which images can be captured and displayed on the device. Thus, 200A shows a front view of the electronic device, comprising a display 205 on which images captured by the cameras can be presented. On the backside of the electronic device 200B, the cameras are visible. They include camera 1 210A, camera 2 210B, and camera 3 210C. Each of these cameras may be associated with different native zoom levels. The native zoom levels may cause a field of view for each of the cameras to differ. The field of view of each of the cameras may further differ based on the difference in relative orientation on the electronic device 200B.

Figure 2B:
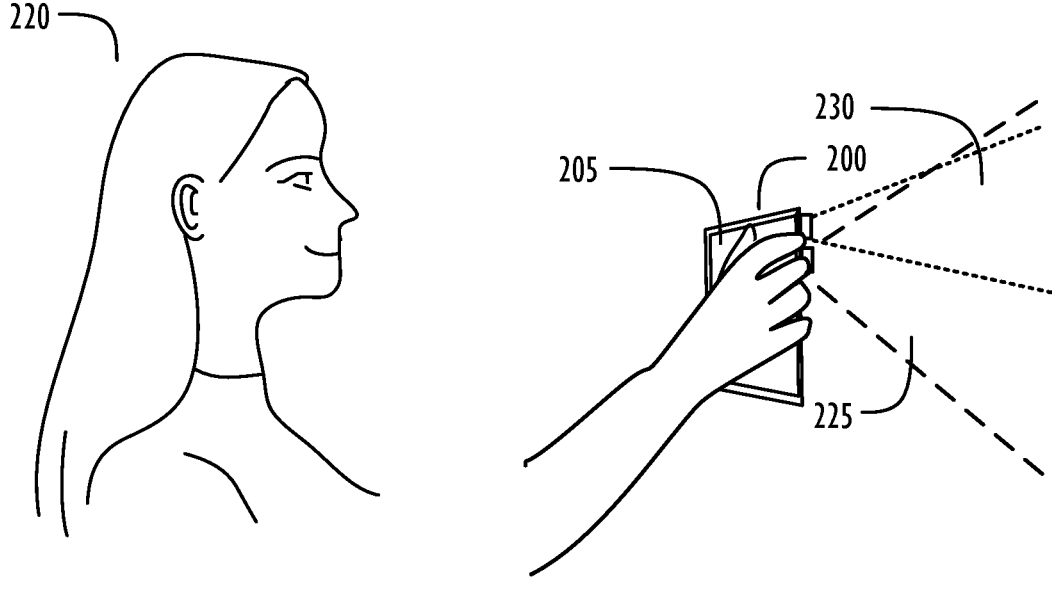

Turning to FIG. 2B, a system setup is shown in which a user 220 is using the electronic device 200 to capture image data. The user holds the electronic device 200 with the display 205 facing towards the user. The multiple cameras 210A, 210B, and 210C are facing away from the user 200. Each of these cameras has a different field of view. For example, field of view 230 may refer to the field of view of camera 210A, whereas field of view 225 may refer to the field of view of camera 210B. As shown, the cameras have different geometric characteristics which amounts to a change in relative orientation (pose) 200, and in intrinsics such as optical centers and focal length.

Returning to FIG. 1, a first frame 110 of the first series of frames 100 is captured by camera 1, having an optical zoom of 1×. For purposes of clarity, a dot is presented at the central point of the frame to aid the reader in identifying differences in the field of view of the preview frames across each series of preview frames. The optical zoom may refer to a native zoom level of the camera capturing the image. As will be described below, the optical zoom 1× may be selected by a user for image capture. For purposes of this example, camera 1 may have a native zoom of 1×, so no additional digital zoom is required. For example, returning to FIG. 2, camera 210B may be used which has a native zoom of 1×. Thus, as shown at the first frame 160 of the second series of frames 150, the first frame 160 is also captured from camera 1 having an optical zoom of 1× and appears the same as the first frame 110 of the first series of frames 100. That is, because the optical zoom matches a native zoom level of one of the cameras of the multi-camera system, the camera of the multi-camera system having the matching zoom level will be used without digital zoom being applied.

Similarly, the last frame 140 of the first series of frames 100 is captured by camera 2 having an optical zoom of 3×. The last frame 190 of the second series of frames 150 is also captured by camera 2 having an optical zoom of 3×. These frames also appear the same, because the requested zoom level matches the optical zoom of one of the cameras (i.e., camera 2) of the multi-camera system. For example, returning to FIG. 2, camera 210A maybe used which has a native zoom of 3×.

The difference in the series of frames during image capture preview with and without camera alignment mitigation becomes apparent when viewing the second and third frames of the first series of frame 100 and the second series of frames 150. Turning to the first series of frames 100 where mitigation techniques are not applied, the second frame 120 is captured from camera one, and adjusted with a digital zoom to a zoom level of 1.5×. Similarly, the third frame 130 is also captured from camera 1, and adjusted with a digital zoom of 2×. As shown, the midpoint of the frame remains at the top of the tree in the scene. However, when the digital zoom reaches 3×, the midpoint of the frame jumps to a right edge of the tree. The difference is also shown in that an apex of the hill on the left side of the frame remains in view through the first, second, and third frame, but is suddenly cut off in the 4th frame. By contrast, the house on the right slowly approaches the edge of the frame through the first, second and third frames, but remains fully visible in the 4th frame. This is because when digital zoom is applied to the image from camera 1, the resulting image data maintains the central point of the field of view while representing the requested zoom level. By contrast, because camera 2 has a different field of view than camera 1, and is displaced from the first camera on the electronic device, the midpoint of the fourth frame 140 is significantly different than the midpoints of the prior frames as compared to the scene.

To avoid the jump in field of view corresponding to the camera change at the fourth frame, embodiments described herein apply a technique to transform the image in the frame in accordance with the amount of digital zoom applied to the frame and in relation to a native zoom level of the next available camera. Said another way, as the zoom level approaches the native zoom level of the next available camera, the field of view of the preview image is transformed toward the field of view of the next available camera such that when the camera is switched, the field of view does not suddenly change. This is apparent in the second series of frames 150. In particular, the second frame 170 is captured from camera one, and adjusted to a digital zoom to a zoom level of 1.5×. Similarly, the third frame 180 is also captured from camera 1, and adjusted to a digital zoom of 2×. As shown, the midpoint of the frame is transformed with each frame to move toward the midpoint of the fourth frame 190 captured by camera 2. That is, in the second frame 170 of the second series of frame 150, the midpoint is no longer at the top of the tree, but at a top right portion of the tree. Similarly, in the third frame 180 of the second series of frames 150, the midpoint is more central on the tree. Thus, when the digital zoom reaches 3×, the midpoint of the frame moves to the right edge of the tree, but the change in cameras is less evident as the field of view appears more consistent across the frames. The difference is also shown in that the apex of the hill on the left side of the frame approaches the edge of the frame in the second frame 170 and the third frame 180, rather than suddenly disappearing in the fourth frame, as in the first series of frames 100. Similarly, in the first series of frames 100, the horizon appears to approach the bottom of the frame in the second frame 120 and third frame 140, but jumps up toward the center of the frame in the fourth frame 140. By contrast, in the second series of frames 150, the horizon remains more consistently in the bottom half of the frame. According to one or more embodiments, the transformation may rely on overscan data to utilize pixels which are capture by the sensor but not typically presented. By reserving these overscan pixels, the image data can be transformed without going beyond available pixels.

Exemplary Methods for Improving Preview Image Transitions

Figure 3:
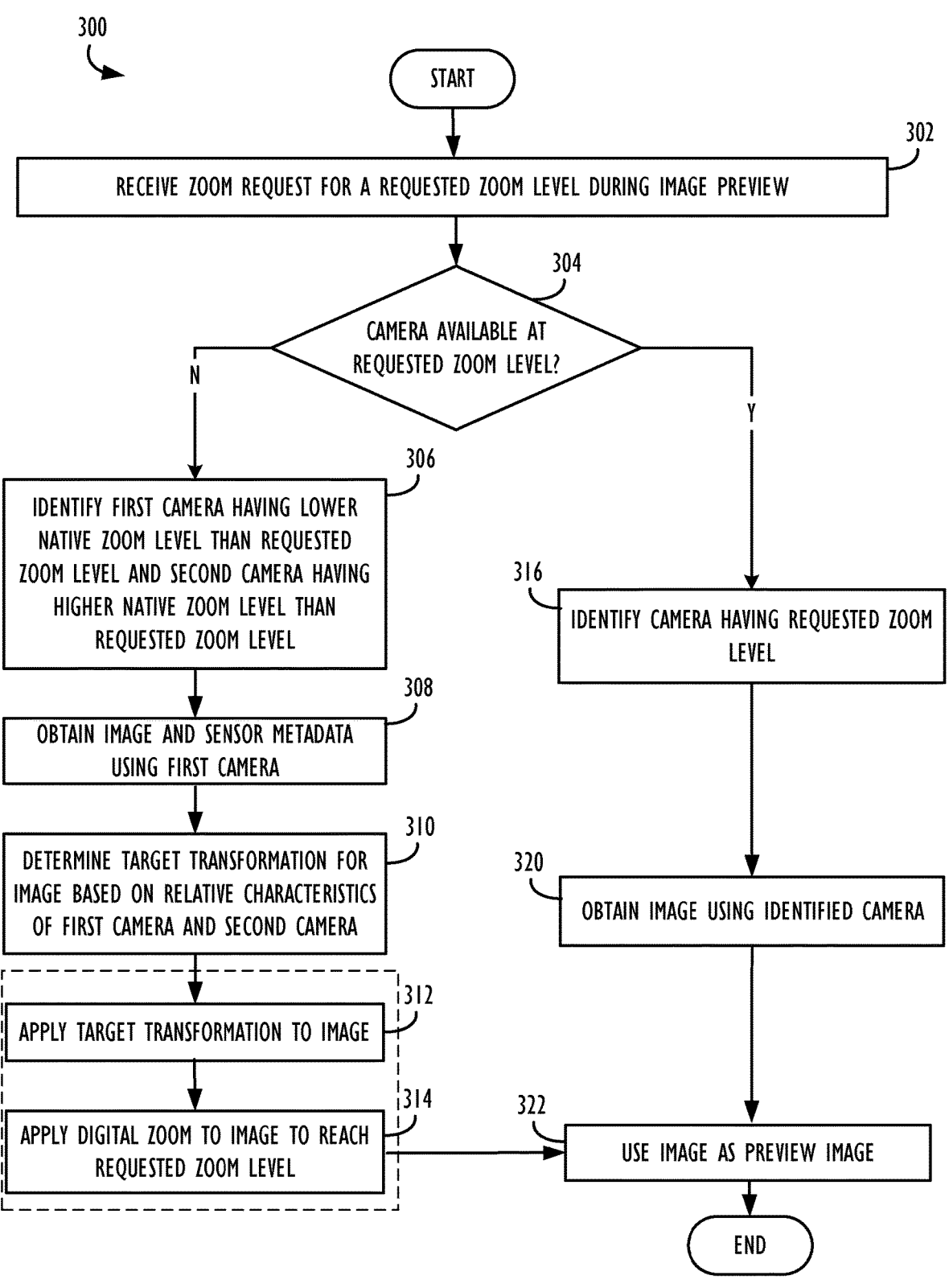
FIG. 3 shows, in flowchart form, a technique for generating a preview image at a requested zoom level, in accordance with one or more embodiments.

The process for transforming the image content during optical zoom is explained with respect to FIG. 3. FIG. 3 shows, in flowchart form, a technique for generating a preview image at a requested zoom level, in accordance with one or more embodiments. For purposes of explanation, the following steps will be described as being performed by particular components. However, it should be understood that the various actions may be performed by alternate components. In addition, the various actions may be performed in a different order. Further, some actions may be performed simultaneously, some may not be required, or others may be added.

The flowchart 300 begins at block 302, where a zoom request is received for a requested zoom level during image capture preview. The zoom request may be in the form of user input which indicates a zoom level at which to view a preview and/or capture an image. For example, a zoom wheel or other input component may be provided such that the user can select a preferred zoom level as the electronic device presents preview images. As another example, the electronic device may be configured to receive other user input to determine a requested zoom level, such as a pinch, drag, or other manipulation of the preview image stream.

The flowchart 300 continues at block 304, where a determination is made as to whether a camera is available with the requested zoom level. Said another way, among the cameras of the multicamera system, each may have a different native zoom level. The determination is made as to whether the native zoom level of any of the cameras of the multicamera system match the requested zoom level.

If a determination is made at block 304 that a camera is available at the requested zoom level, then the flowchart 300 proceeds to block 316, where the camera having the requested zoom level is identified. This may occur, for example, when a user toggles to a zoom level that matches the optical zoom of one of the cameras. In the example shown in FIG. 1, this may include, for example, a requested zoom level of 1× matching camera 1, or a requested zoom level of 3× matching camera 2. The flowchart then proceeds to block 320, where an image is obtained using the identified camera. For example, a stream of preview images may be obtained using the identified camera, and at block 322, the obtained image may be used as a preview image. In some embodiments, other treatments or image processing techniques may be applied to the image prior to presentation. Further, in some embodiments, the preview image may be a particular frame of the series of frames streamed during the preview mode of the camera. As such, the flowchart 300 may repeat again for each frame.

Returning to block 304, if a determination is made that a camera is not available at the requested zoom level, then the flowchart 300 proceeds to block 306. At block 306, the first camera having a lower native zoom level than the requested zoom level is identified, and the second camera having a higher native zoom level than the requested zoom level is identified. According to our embodiments, the native zoom level may refer to the optical zoom associated with each camera. The first camera may be a camera among the multi-camera system having a next lowest zoom level. Similarly, the second camera may be associated with a camera having index high zoom level.

The flowchart 300 continues at block 308, where an image is obtained using the first camera. The obtained image may be a frame of the preview image stream obtained during the preview mode. The image obtained from the first camera will have a zoom level corresponding to the native zoom level of the first camera.

At block 310, a target transformation is determined for the image based on the relative characteristics of the first camera and the second camera. According to one or more embodiments, the target transformation indicates a corrective action to be applied to the image data, such as a shift, a rotation, or the like. As described above with respect to FIG. 1, the target transformation may be based on the requested zoom as compared to the first camera zoom and the second camera zoom, as well as the field of view and other characteristics of the first camera and the second camera such that as the requested zoom approaches the optical zoom of the second camera. Thus, the target transformation may include, for example, a distance and direction the image should be transformed corresponding to the particular requested zoom level. In some embodiments, because the characteristics of the first and second cameras will remain the same relative to each other, the determined target transformation may be predefined and may be obtained, for example, via a lookup table. For example, because the transformation is based on a requested zoom, the requested zoom may be mapped to a target transformation which can be applied to the particular frame. Other techniques for determining the target transformation will be explained in greater detail below with respect to FIG. 4.

The flowchart proceeds to block 312, where a digital zoom is applied to the image to reach the requested zoom level. For example, the image data captured by the first camera having the first optical zoom level may be cropped and scaled to achieve the requested zoom level. Additionally, at block 314, the target transformation is applied to the image. Optionally, the digital zoom and the target transformation may be applied independently, or may be applied in combination. In some embodiments, the target transformation involves transforming the cropped portion of the first camera image frame to obtain a transformed image. Said another way, the portion of the image frame that was cropped during the digital zoom may be transformed by the target transformation (such as a distance and direction) among the captured image data to obtain an alternative frame. In some embodiments, other processes may be refined, such as different scaling or performing a full homography correction. Alternatively, in some embodiments, the target transformation may be applied to the image frame from the first camera at 310 prior to the digital zoom being applied at block 312 such that when the image content is cropped, the center of the frame is correct in accordance with the target transformation.

The flowchart 300 concludes at block 322, where the zoomed, cropped image may be used as a preview image. In some embodiments, other treatments or image processing techniques may be applied to the image prior to presentation. Further, in some embodiments, the preview image may be a particular frame of the series of frames streamed during the preview mode of the camera. As such, the flowchart 300 may repeat again for each frame.

FIG. 4 shows, in flowchart form, additional detail for a technique for determining a target transformation based on a requested zoom level, in accordance with one or more embodiments. In particular, FIG. 4 shows example techniques for performing the step of determining the target transformation, as described above with respect to block 310 of FIG. 3. For purposes of explanation, the following steps will be described as being performed by particular components. However, it should be understood that the various actions may be performed by alternate components. In addition, the various actions may be performed in a different order. Further, some actions may be performed simultaneously, some may not be required, or others may be added.

The flowchart 400 begins at block 402, where a first difference between the requested zoom and a first camera optical zoom is determined. Further, the flowchart 400 includes at block 404, determining a second difference between the requested zoom and a second camera optical zoom. That is, a relative zoom is determined based on the optical zooms of the two cameras. The first difference and second difference may therefore indicate how close the requested zoom is to the first camera as compared to the second camera.

The flowchart 400 proceeds to block 406, where a relative pose of the first camera and the second camera are determined. The relative pose indicates, for example, a distance, direction, and/or orientation between the two cameras. The relative pose of the first camera and the second camera may be predefined, for example during a factory alignment process. At block 408, relative intrinsics of the first camera and the second camera are determined. The relative intrinsics may include, for example relative characteristics of an optical center of each camera, focal length of each camera, optical zoom, such as native zoom of the cameras, and the like.

The flowchart 400 proceeds to block 410, where a target transformation is determined. The target transformation may indicate a corrective action to be applied to the image data. Optionally, as shown at block 412, a distance and direction are determined for the target transformation based on the first difference, the second difference, the relative pose, and the relative intrinsics. According to one or more embodiments, this transformation can be estimated as a shift or adjustment applied to the image which causes the field of view of the first camera to approach the field of view of the second camera as digital zoom is applied to image data from the first camera. Thus, the various considerations may be based on a comparison of the cameras, and a comparison of the requested zoom to the optical zooms of the cameras.

In addition to, or in alternative to the distance and direction determined at block 412, a target rotation may also be determined based on the first difference, the second difference, the relative pose, and relative intrinsics, as shown in optional block 414. In particular, because the first camera and the second camera are oriented differently and have different intrinsics, a rotation may be applied to align the image data captured from the first camera and the second camera. The target rotation may therefore be used as the target transformation to mitigate alignment issues between the first and second camera.

Exemplary Camera Alignment Mitigation in Preview and Capture

Figure 5:
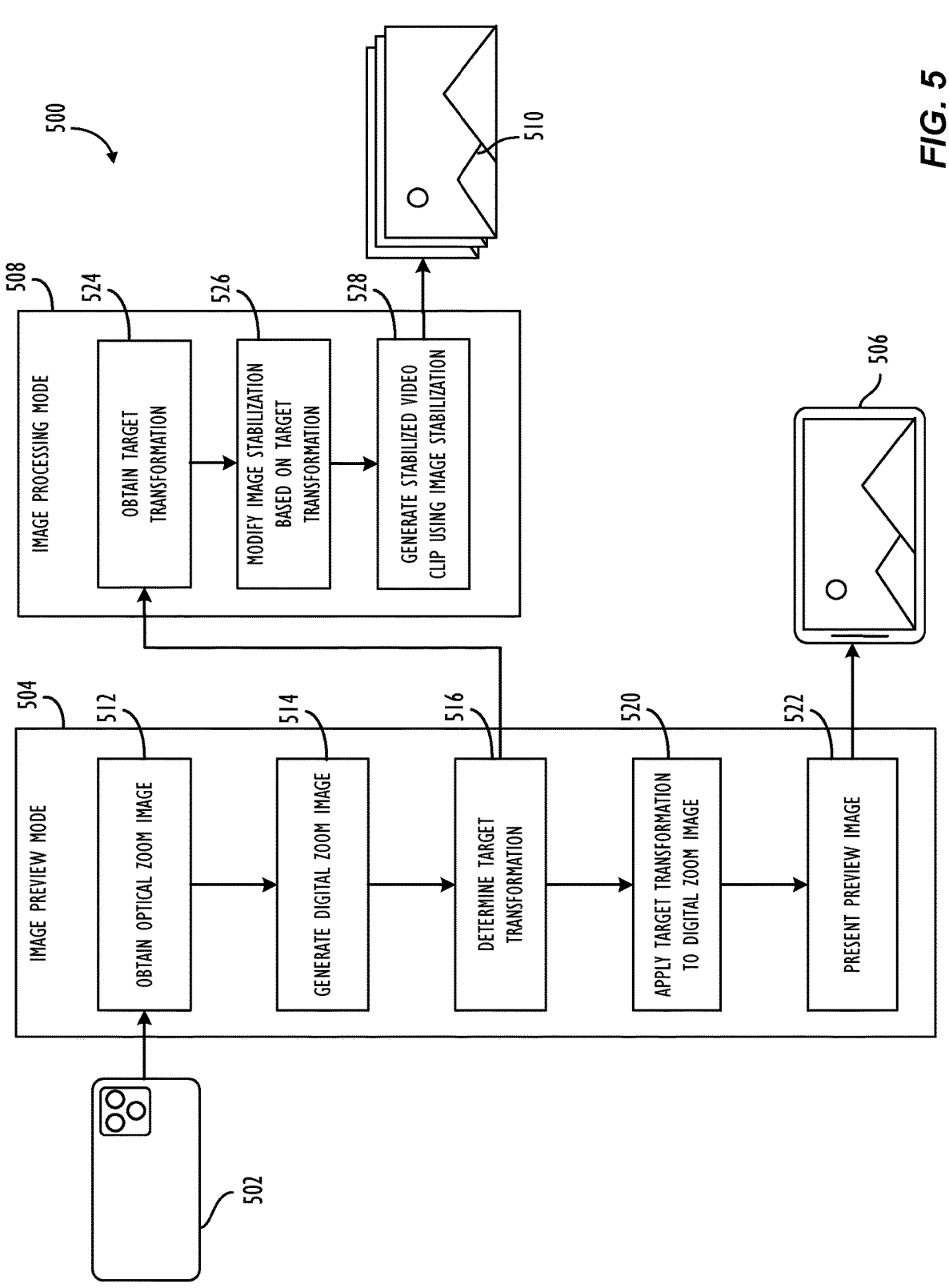
FIG. 5 shows a flow diagram for utilizing the determined target transformation for smooth camera transition, according to one or more embodiments.

While the above-described techniques have been described with respect to a camera preview mode, according to one or more embodiments, the techniques can be used to enhance image capture generally. FIG. 5 depicts a flow diagram for utilizing the determined target transformation for image stabilization, according to one or more embodiments. For purposes of explanation, the following steps will be described as being performed by particular components. However, it should be understood that the various actions may be performed by alternate components. In addition, the various actions may be performed in a different order. Further, some actions may be performed simultaneously, some may not be required, or others may be added.

The flow diagram 500 begins with an image preview mode 504. The image preview mode involves, at block 512, obtaining an optical zoom image. According to one or more embodiments, the optical zoom image may be associated with a first camera having a lower native zoom level than a requested zoom level. The optical zoom image is captured from a multicamera system, such as that shown in electronic device 502.

The flow diagram 500 continues to block 514, where a digital zoom image is generated. For example, the image data captured by the first camera having the first optical zoom level may be cropped and scaled to achieve the requested zoom level. The flowchart also includes, at block 516, a determination of a target transformation. In some embodiments, the target transformation will cause the field of view of the first camera to approach the field of view of a second camera having a next higher optical zoom level as digital zoom is applied to image data from the first camera. The target transformation 516 may be determined as described above with respect to FIG. 4.

As described above, at block 520, the target transformation can be applied to the digital zoom image. In some embodiments, applying the target transformation involves transforming the cropped portion of the first camera image frame to obtain a transformed image. Said another way, the portion of the image frame that was cropped during the digital zoom may be transformed by the target transformation (such as a distance and direction) among the captured image data to obtain an alternative frame. In some embodiments, other processes may be refined, such as scaling or applying a general image homography.

The image preview mode 504 concludes at block 522, where the preview image is presented on a display, as shown at electronic device 506, where the preview image is presented on a display of the electronic device. According to one or more embodiments, the process in the image preview mode 504 proceeds as the preview stream is generated, such that the device 502 captures preview image data, which is then processed and is presented, as shown at 506 on an ongoing basis and as a requested zoom is dynamically modified.

Returning to block 516, in some embodiments, the determined target transformation may be passed on to an image processing module 508 for use in image stabilization. In particular, at block 524, the image processing module 508 obtains the target transformation. At block 526, the image processing mode 508 includes modifying the image stabilization based on the target transformation. For example, an image stabilization process can be modified or adjusted in accordance with the target transformation to improve performance of the process. As an example, in video image stabilization, the target transformation provides the stabilization process an indication of an upcoming transform. As such, the stabilization process can be enhanced by the determined target transformation to prepare for upcoming transforms and camera changes in a captured video. Thus, the flowchart concludes at block 528, where the stabilized video clip is generated using image stabilization, as shown by the series of frames 510.

Exemplary Electronic Computing Devices

Figure 6:
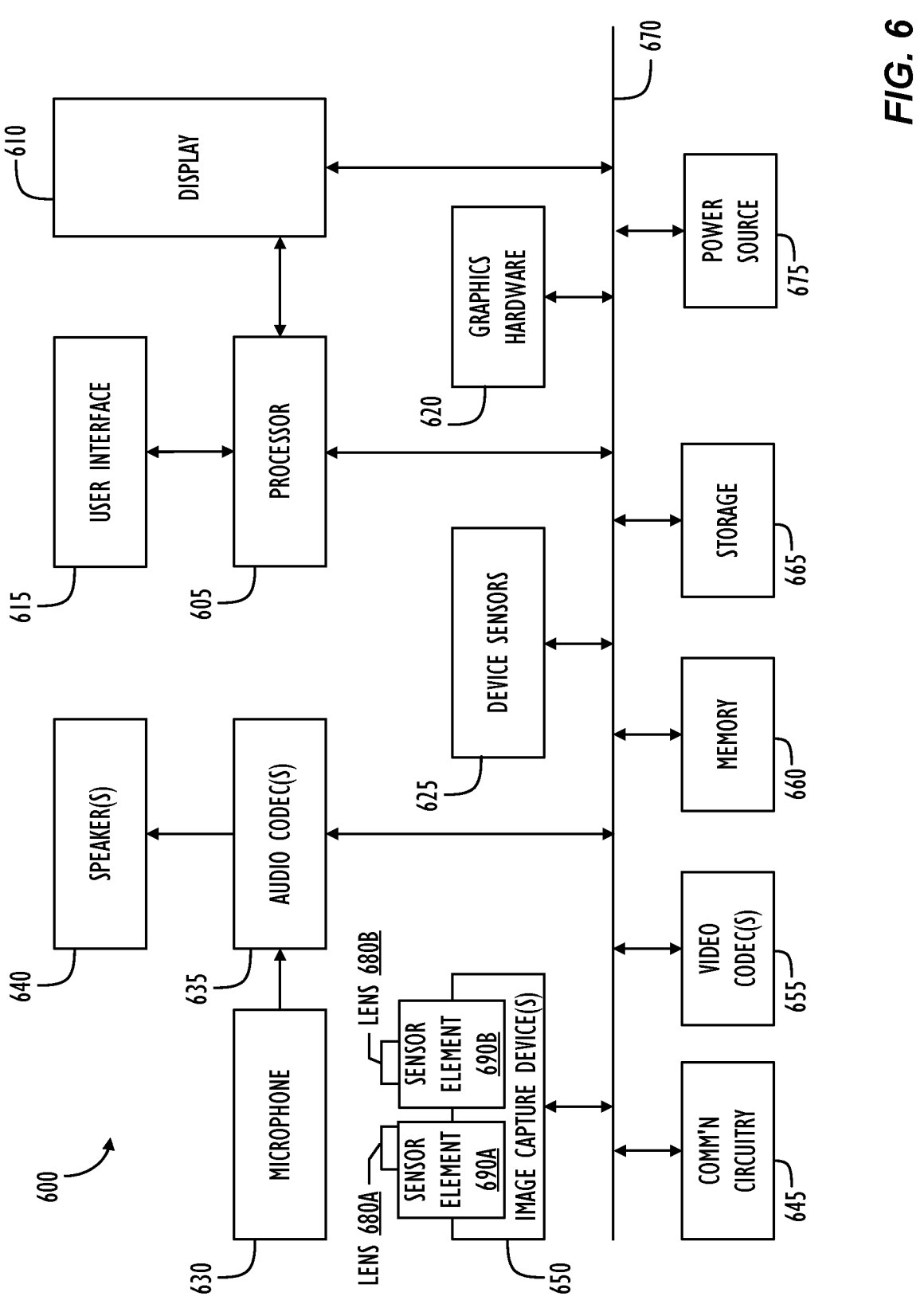
FIG. 6 is a block diagram illustrating a programmable electronic computing device, in which one or more of the techniques disclosed herein may be implemented.

Referring now to FIG. 6, a simplified functional block diagram of illustrative programmable electronic computing device 700 is shown according to one embodiment. Electronic device 600 could be, for example, a mobile telephone, personal media device, portable camera, or a tablet, notebook or desktop computer system. As shown, electronic device 600 may include processor 605, display 610, user interface 615, graphics hardware 620, device sensors 625 (e.g., proximity sensor/ambient light sensor, accelerometer, inertial measurement unit, and/or gyroscope), microphone 630, audio codec(s) 635, speaker(s) 640, communications circuitry 645, image capture device(s) 650, which may, e.g., comprise multiple camera units/optical image sensors having different characteristics or abilities (Still Image Stabilization (SIS), high dynamic range (HDR), optical image stabilization (OIS) systems, optical zoom, digital zoom, etc.), video codec(s) 655, memory 660, storage 665, and communications bus 680.

Processor 605 may execute instructions necessary to carry out or control the operation of many functions performed by electronic device 600 (e.g., such as the processing of images in accordance with the various embodiments described herein). Processor 605 may, for instance, drive display 610 and receive user input from user interface 615. User interface 615 can take a variety of forms, such as a button, keypad, dial, a click wheel, keyboard, display screen and/or a touch screen. User interface 615 could, for example, be the conduit through which a user may view a captured video stream and/or indicate particular image frame(s) that the user would like to capture (e.g., by clicking on a physical or virtual button at the moment the desired image frame is being displayed on the device's display screen). In one embodiment, display 610 may display a video stream as it is captured while processor 605 and/or graphics hardware 620 and/or image capture circuitry contemporaneously generate and store the video stream in memory 660 and/or storage 665. Processor 605 may be a system-on-chip (SOC) such as those found in mobile devices and include one or more dedicated graphics processing units (GPUS). Processor 605 may be based on reduced instruction-set computer (RISC) or complex instruction-set computer (CISC) architectures or any other suitable architecture and may include one or more processing cores. Graphics hardware 620 may be special purpose computational hardware for processing graphics and/or assisting processor 605 perform computational tasks. In one embodiment, graphics hardware 620 may include one or more programmable graphics processing units (GPUs) and/or one or more specialized SOCs, e.g., an SOC specially designed to implement neural network and machine learning operations (e.g., convolutions) in a more energy-efficient manner than either the main device central processing unit (CPU) or a typical GPU, such as Apple's Neural Engine processing cores.

Image capture device(s) 650 may comprise one or more camera units configured to capture images, e.g., images which may be processed to help further calibrate said image capture device in field use. Image capture device(s) 650 may include two (or more) lens assemblies 680A and 680B, where each lens assembly may have a separate focal length. For example, lens assembly 680A may have a shorter focal length relative to the focal length of lens assembly 680B. Each lens assembly may have a separate associated sensor element, e.g., sensor elements 690A/690B. Alternatively, two or more lens assemblies may share a common sensor element. Image capture device(s) 650 may capture still and/or video images. Output from image capture device(s) 650 may be processed, at least in part, by video codec(s) 655 and/or processor 605 and/or graphics hardware 620, and/or a dedicated image processing unit or image signal processor incorporated within image capture device(s) 650. Images so captured may be stored in memory 660 and/or storage 665.

Memory 660 may include one or more different types of media used by processor 605, graphics hardware 620, and image capture device(s) 650 to perform device functions. For example, memory 660 may include memory cache, read-only memory (ROM), and/or random access memory (RAM). Storage 665 may store media (e.g., audio, image and video files), computer program instructions or software, preference information, device profile information, and any other suitable data. Storage 665 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 660 and storage 665 may be used to retain computer program instructions or code organized into one or more modules and written in any desired computer programming language. When executed by, for example, processor 605, such computer program code may implement one or more of the methods or processes described herein. Power source 675 may comprise a rechargeable battery (e.g., a lithium-ion battery, or the like) or other electrical connection to a power supply, e.g., to a mains power source, that is used to manage and/or provide electrical power to the electronic components and associated circuitry of electronic device 600.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A non-transitory computer readable medium comprising computer readable code executable by a processor to:
receive a zoom level request for a multicamera system comprising a first camera having a first optical zoom metric and a second camera having a second optical zoom metric;
obtain an image frame from the first camera;
determine a target transformation based on: 1) a first difference between the first optical zoom and a requested zoom level, 2) a second difference between the second optical zoom and the requested zoom level, and 3) relative geometric characteristics of the first camera and the second camera within the multicamera system;
apply a digital zoom to the image frame in accordance with the zoom level request to obtain a digitally zoomed image frame; and
apply the target transformation to the digitally zoomed image frame to obtain a transformed digitally zoomed image frame.

2. The non-transitory computer readable medium of claim 1, further comprising computer readable code to:
present the transformed digitally zoomed image frame as a preview frame.

3. The non-transitory computer readable medium of claim 1, further comprising computer readable code to:
receive an additional zoom level request at an additional zoom level; and
in response to the additional zoom level request matching the second optical zoom metric, switch from image capture using the first camera to the second camera.

4. The non-transitory computer readable medium of claim 1, further comprising computer readable code to:
adjust video image stabilization parameter applied to the digitally zoomed image frame in accordance with the target transformation to generate a stabilized version of the digitally zoomed image frame; and
include the stabilized version of the digitally zoomed image frame in a stabilized video clip produced by the multicamera system.

5. The non-transitory computer readable medium of claim 1, wherein the relative geometric characteristics of the first camera and the second camera comprises at least one of:
a relative pose between the first camera and the second camera; and
relative intrinsics between the first camera and the second camera.

6. The non-transitory computer readable medium of claim 5, wherein the computer readable code to determine a target transformation further comprises computer readable code to:
determine a target rotation based on: 1) a difference between intrinsics of the first camera and the second camera, and 2) the relative pose of the first camera and the second camera; and
apply the target rotation to the digitally zoomed image frame.

7. The non-transitory computer readable medium of claim 1, wherein the first camera comprises a first field of view (FOV), and wherein the second camera comprises a second FOV that is narrower than the first FOV.

8. A method comprising:
receiving a zoom level request for a multicamera system comprising a first camera having a first optical zoom metric and a second camera having a second optical zoom metric;
obtaining an image frame from the first camera;
determining a target transformation based on: 1) a first difference between the first optical zoom and a requested zoom level, 2) a second difference between the second optical zoom and the requested zoom level, and 3) relative geometric characteristics of the first camera and the second camera within the multicamera system;
applying the target transformation to the image frame to obtain a transformed image frame; and
applying a digital zoom to the transformed image frame in accordance with the zoom level request to obtain a transformed digitally zoomed image frame.

9. The method of claim 8, further comprising:
presenting the transformed digitally zoomed image frame as a preview frame.

10. The method of claim 8, further comprising:
receiving an additional zoom level request at an additional zoom level; and
in response to the additional zoom level request matching the second optical zoom metric, switching from image capture using the first camera to the second camera.

11. The method of claim 8, further comprising:
adjusting video image stabilization parameter applied to the digitally zoomed image frame in accordance with the target transformation to generate a stabilized version of the digitally zoomed image frame; and
including the stabilized version of the digitally zoomed image frame in a stabilized video clip produced by the multicamera system.

12. The method of claim 8, wherein the relative geometric characteristics of the first camera and the second camera comprises at least one of:
a relative pose between the first camera and the second camera; and
relative intrinsics between the first camera and the second camera.

13. The method of claim 12, wherein determining a target transformation further comprises:
determining a target rotation based on: 1) a difference between intrinsics of the first camera and the second camera, and 2) the relative pose of the first camera and the second camera; and
applying the target rotation to the digitally zoomed image frame.

14. The method of claim 8, wherein the first camera comprises a first field of view (FOV), and wherein the second camera comprises a second FOV that is narrower than the first FOV.

15. A system comprising:
one or more processors; and
one or more computer readable media comprising computer readable code executable by the one or more processors to:
receive a zoom level request for a multicamera system comprising a first camera having a first optical zoom metric and a second camera having a second optical zoom metric;

obtain an image frame from the first camera;

determine a target transformation based on: 1) a first difference between the first optical zoom and a requested zoom level, 2) a second difference between the second optical zoom and the requested zoom level, and 3) relative geometric characteristics of the first camera and the second camera within the multicamera system;

apply a digital zoom to the image frame in accordance with the zoom level request to obtain a digitally zoomed image frame; and apply the target transformation to the digitally zoomed image frame to obtain a transformed digitally zoomed image frame.

16. The system of claim 15, further comprising computer readable code to:

present the transformed digitally zoomed image frame as a preview frame.

17. The system of claim 15, further comprising computer readable code to:

receive an additional zoom level request at an additional zoom level; and in response to the additional zoom level request matching the second optical zoom metric, switch from image capture using the first camera to the second camera.

18. The system of claim 15, further comprising computer readable code to:

adjust video image stabilization parameter applied to the digitally zoomed image frame in accordance with the target transformation to generate a stabilized version of the digitally zoomed image frame; and include the stabilized version of the digitally zoomed image frame in a stabilized video clip produced by the multicamera system.

19. The system of claim 15, wherein the relative geometric characteristics of the first camera and the second camera comprises at least one of:

a relative pose between the first camera and the second camera; and relative intrinsics between the first camera and the second camera.

20. The system of claim 19, wherein the computer readable code to determine a target transformation further comprises computer readable code to:

determine a target rotation based on: 1) a difference between intrinsics of the first camera and the second camera, and 2) the relative pose of the first camera and the second camera; and apply the target rotation to the digitally zoomed image frame.

*   *   *   *   *